Dec. 29, 1936.  E. HEITZMANN  2,065,583
LIQUID STERILIZING APPARATUS
Filed May 25, 1935  2 Sheets-Sheet 1
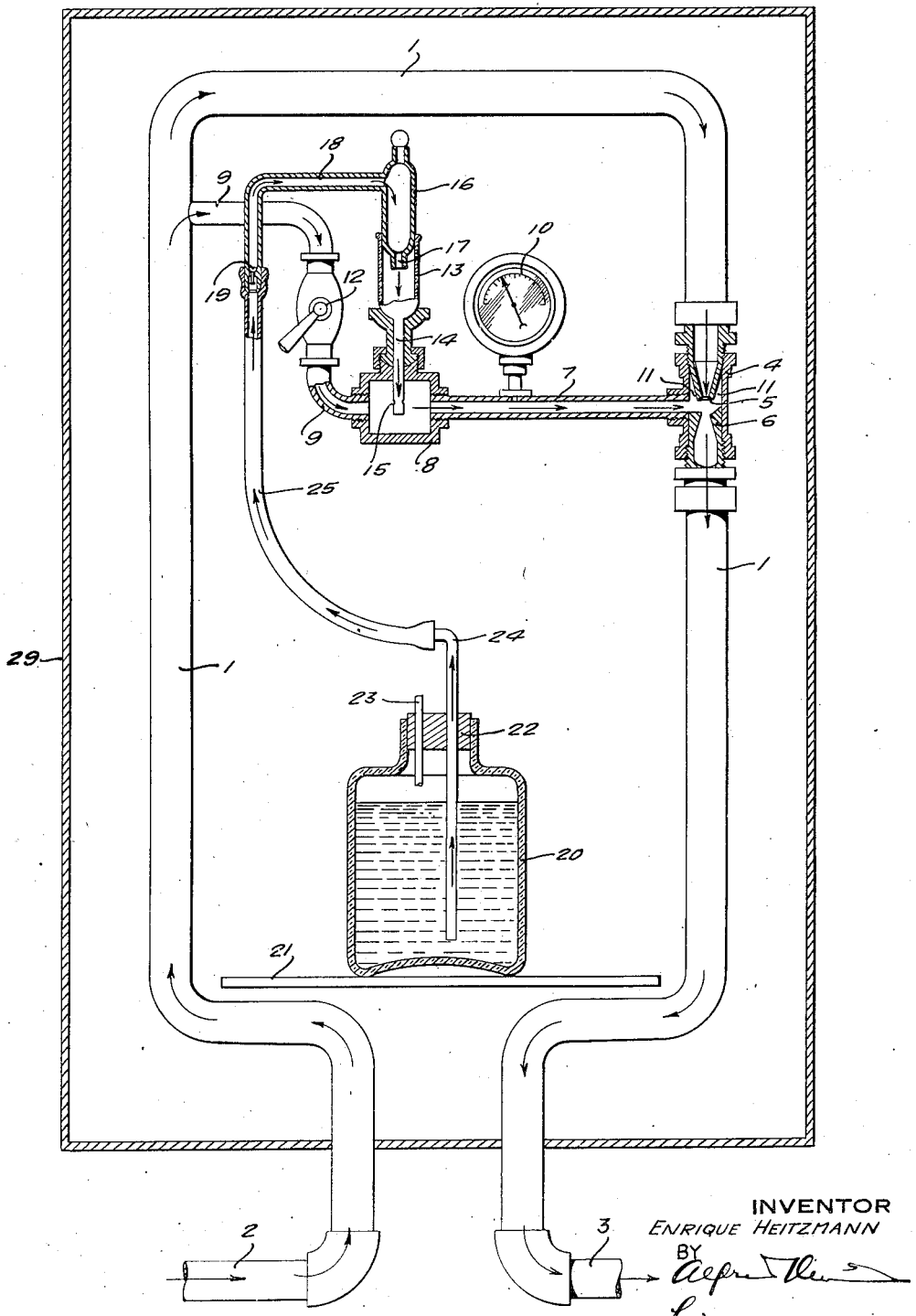
INVENTOR
ENRIQUE HEITZMANN

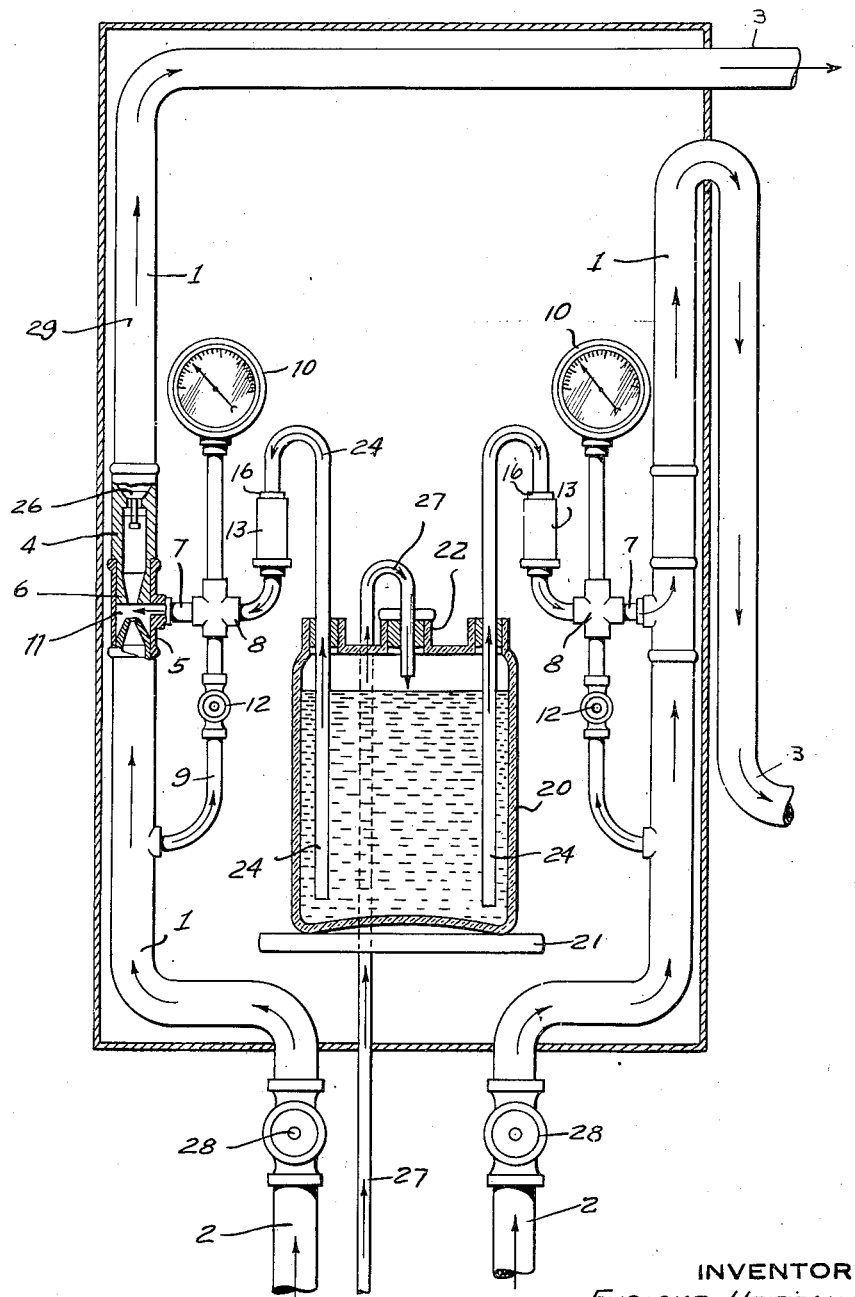

Patented Dec. 29, 1936

2,065,583

UNITED STATES PATENT OFFICE 2,065,583

LIQUID STERILIZING APPARATUS

Enrique Heitzmann, Buenos Aires, Argentina

Application May 25, 1935, Serial No. 23,407
In Argentina January 28, 1935

2 Claims. (Cl. 210—28)

The present invention relates to a new liquid sterilizing apparatus and has for its main object a new type of apparatus specially adaptable to the bacteriological purification of waters for individual consumption, as well as for any other kind of liquid which must be obtained in a perfectly aseptic condition.

The different methods and apparatus used heretofore for purifying and sterilizing liquids are well known, particularly in the obtention of potable water for public consumption, the contamination of which is the cause of serious and frequent sicknesses.

One of the purifying systems most generally used for the obtention of portable water, is based on the use of filters of different kinds, but this method has, in general, not given the desired result, since the filtration of water only produces a clarification thereof, without contributing to its bacteriological purification.

Chemical purifying methods have also been proposed, generally based on the use of chlorine, a product which has been recognized as the most efficient element for the destruction of the Ebert bacillus, the intestinal microbe, dysentery amœba, cholera vibrio and other bacteria, and for this reason all modern installations for the sterilization of water for consumption use this purifying agent, whether in the form of dissolved gas or in the form of compounds such as sodium and potassium hypochlorites.

Both purifying means require special apparatus termed chlorinators, which apart from the deficient results, lack the necessary element for allowing the instantaneous sterilization of the water, requiring on the other hand a long contact between the disinfecting agent and the water to be purified.

In order to obviate these drawbacks, the new type of liquid purifying apparatus subject of the present invention has been proposed, which, apart from its excellent constructive and functional features, reduced cost and efficient operation, offers evident advantages over all other types of apparatus suggested and used heretofore for the same purpose.

The new type of sterilizing apparatus subject of the present invention uses sodium hypochlorite or other suitable chemical purifier as the disinfecting agent, according to the nature of the liquid to be sterilized.

Also, this type of apparatus operates in an automatic or interrupted manner, so that the simple passage of water or liquid through the interior thereof is sufficient to instantaneously obtain a product in perfectly aseptic condition and bacteriologically pure.

A further advantage of the new type of apparatus subject of the present invention resides in the fact that the feed of the hypochlorite or other disinfecting agent is effected in a purely automatic manner, since same is produced by the action of the vacuum produced by the liquid to be sterilized itself; consequently, said feed will at all times be perfectly proportional to the amount of liquid to be purified or sterilized.

The invention also contemplates other objects which will be understood from the course of the present specification and particularly pointed out in the appended claims.

In order that the invention may be clearly understood and readily carried into practice, same has been illustrated by way of example in a preferred embodiment, in the accompanying drawings, wherein:—

Figure 1 is a schematic front view of the new type of liquid sterilizing apparatus subject of the present invention, which, for the sake of a clearer understanding, has been assumed as partially cut through a vertical plane; and Figure 2 shows a modification of the same apparatus, which in this case is arranged so that it may only operate two independent liquid feed currents.

The same reference characters indicate like or corresponding parts in both figures.

In the embodiment shown in Figure 1, the new type of apparatus which in this case has been assumed as intended to be used as a water sterilizing apparatus, comprises mainly a main conduit 1, suitably elbowed in the shape of a rectangular frame, which is connected by its free ends with the pipe 2 for the inlet of water to be sterilized, and a second pipe 3 for the outlet of sterilized water.

At an intermediate point of the downward branch of the conduit 1 is located a vacuum injector, constituted mainly by a cylindrical body 4, within which is arranged a conical nozzle 5 reaching approximately to half the length of said body 4. In front of this nozzle, and at a short distance from the end thereof, is a conduit 6 the internal diameter of which is gradually increased towards its lower portion, allowing the passage of liquid towards the outlet of the apparatus.

It can also be seen in Figure 1 that a short horizontal tube 7, of reduced diameter, leads to the portion in front of the outlet of the nozzle 5 and the inlet of the enlarged conduit 6, said horizontal tube 7 communicating by its free end with the interior of a box 8 of suitable dimensions and shape; in turn, from the opposite face of said box 8 starts a further thin tube 9, suitably elbowed, which leads from the upward branch of the main conduit 1 mentioned above.

On the other hand, a vacuum gauge 10 is provided at an intermediate point of the horizontal conduit 7, the object of said vacuum gauge being to measure the degree of vacuum produced in the chamber 11 surrounding the nozzle 5 of the injector, and in turn, a line cock 12 is placed along the elbowed conduit 9, for the purpose of regulating the passage of the liquid sucked by said injector.

On the upper part of the box 8 described above is hermetically secured, whether by screw threads or other means, a tubular element 13 ending downwardly in a narrow extension 14 provided with small perforations 15, with outlet in the interior of said box; in turn, on the upper mouth of said tubular element is provided a further element 16 in the shape of a bulb ending downwardly in a small discharge spout 17, from the body of which bulb starts a thin elbowed tube 18 provided at its free lower end with a valve 19 to avoid the backward flow of the liquid.

It can also be seen in Figure 1 that a vessel or container 20 is provided at the lower portion of the apparatus, said container constituting the depository for the sodium hypochlorite or other suitable disinfectant conveniently provided on a fixed support 21; said container is closed by a stopper 22 of rubber or the like, through which passes a small tube 23 for the admission of air to the interior of the container, and a suction tube 24 which reaches almost to the bottom of said container; the free end of tube 24 is in turn connected to the free end of the conduit 18 by means of a tube 25 of rubber or other suitable flexible material.

Figure 2 shows a modified embodiment of the apparatus, in order that it may be used for the alternating or simultaneous sterilization of two independent conduits.

In this case, the basic elements of the assembly, as well as the constructive and functional features of each of them, are identical with those of Figure 1, varying only in small details.

For the operation of the apparatus in this case, in two independent currents of water, same has been provided with two main conduits 1, also connected respectively with the inlet pipes 2 for the water to be sterilized and with the outlet tubes 3 for the sterilized water.

Each of these conduits is combined, as a whole, with the elements specified in the case of Figure 1, although the manner of mounting some of them has been varied slightly in order to better adapt same to the necessities of this case.

Thus, for example, in the modified embodiment represented in Figure 2, it can be seen that the injectors corresponding to each of the main conduits 1 have been interpolated in this case on the upward portion thereof, and to avoid the backward flow of the liquid a valve 26 has been arranged on the outlet mouth of each of the injectors, said valve blocking said outlet.

Also, the container 20 for the deposit of hypochlorite is in this case provided with two suction tubes 24, independent from each other, each of which is directly coupled to the tubular element 16, without the interposition of the flexible tubes 25 and tube 18, mentioned in the case of Figure 1.

On the other hand, the feed of the liquid to the vessel 20 is effected in this case in a purely automatic manner and as soon as it is being consumed. For this purpose, the central stopper 22 is perforated by an elbowed tube 27, the lower end of which communicates with a further lower depository tank (not shown) which does not require any pressure, since the passage of the liquid from said depository to the container 20 is originated, as will be seen later, through the sole action of the vacuum produced in the interior of the latter.

In this case also, the corresponding line cocks 28, for regulating at will the operation of one or both branches of the apparatus, have been provided at the inlet of each of the main conduits 1.

Both types of apparatus are enclosed in a casing 29, of suitable shape and dimensions.

The operation of this type of apparatus, in any of the two embodiments thereof, is exactly the same, and is described hereunder (see Figure 1).

Once the vessel 20 is charged with a certain amount of sodium hypochlorite or other disinfectant used for the purpose, the line cocks of the inlet conduit 2 are opened, whereupon the liquid will enter the main conduit 1, travelling therein in the direction shown by the arrows, to finally leave by the discharge conduit 3.

During this travel, the liquid circulating through the main conduit 1 will leave by the nozzle 5 of the injector, and due to the throttling produced thereby, it will produce a strong depression in the chamber 11 surrounding same, continuing its travel by the enlarged conduit 6, to finally come out by the discharge tube 3.

The depression which, as already stated, was produced in the interior of the chamber 11 of the injector, through the passage of liquid circulating in the main conduit 1, will in turn originate a strong depression in the interior of the conduits 7 and 9 and the box 8, whereby, should the line cock 12 be open, part of the liquid circulating through the upward portion of said main conduit would be compelled to deflect through said conduits 9, box 8, and conduit 7, to mix with the liquid coming out of the nozzle 5 of the injector.

In turn, the vacuum produced in the box 8 will produce a vacuum effect in the tubular bodies 13 and 16, whereby the sodium hypochlorite contained in the vessel 20 will be sucked up to the upper part of the apparatus, travelling through the conduits 24, 25 and 18, flowing successively into the tubular bodies 16 and 13, to finally leave by the orifices 15 of the extension 14 and fall in the shape of drops into the box 8.

Thus, the disinfectant will be carried away by the current of water passing through said box 8, intimately mixing therewith, and the hypohydrochloric solution obtained will mix with the water coming out of the nozzle 5 of the injector.

This simple and instantaneous incorporation of the hypochlorite with the water, is sufficient to produce the desired chemical purification, and the sterilized liquid will come out through the conduit 3, wherefrom it may be taken for the necessary purposes.

Through a suitable regulation of the line cock 12, the passage of liquid through the conduits 9 and 7 will be conveniently graduated, and also as the degree of vacuum produced in the chamber 11 of the injector is proportional to the speed of the liquid circulating in the conduit I, i. e., to its volume, the amount of hypochlorite incorporated with the liquid will be proportional, at all times, to the amount of the latter, the feed of the disinfectant being therefore produced in a perfectly automatic manner.

It will be seen from the above that it is only necessary to circulate water in the main conduit of the apparatus for it to instantaneously come out in a bacteriologically pure condition, and for this reason the new type of apparatus is advantageously adapted for the service of potable waters, or for the provision of aseptic liquids, and due to its form of operation, allows a perfect purification of liquids, regardless of the degree of impurities therein, without the hypochlorite affecting the taste or physical qualities of same.

The apparatus shown in Figure 2 operates exactly in the same manner, as can be seen from the simple observation of said figure as compared with Figure 1.

The invention, such as described, is quite clear and requires no further explanation to those skilled in the art.

It is evident that several modifications of construction and detail may be introduced, without departing from the scope of the present invention as clearly set forth in the appended claims.

Having now particularly described and ascertained the nature of the present invention and the manner in which same is to be carried into practice, I declare that what I claim as my exclusive property is:—

1. A liquid sterilizing apparatus comprising a conduit for passage of the liquid to be sterilized, means providing an injector in said conduit, a tube connecting said injector with a part of said conduit, a vacuum chamber in said tube, a vessel containing a sterilizing liquid, and a tube connecting said vessel with said chamber, said last mentioned tube extending upwardly from said vessel, to a point above said chamber and thence downwardly into said chamber and having a check valve in the upwardly extending portion thereof opening in the direction of flow of liquid from said vessel.

2. A liquid sterilizing apparatus as specified in claim 1, including a cock in the tube connecting the injector with the part of said conduit for controlling the amount of liquid drawn through said tube by said injector.

ENRIQUE HEITZMANN.